(12) United States Patent
Zhai et al.

(10) Patent No.: US 9,081,482 B1
(45) Date of Patent: Jul. 14, 2015

(54) TEXT INPUT SUGGESTION RANKING

(71) Applicant: Google Inc., Mountain View, CA (US)

(72) Inventors: Shumin Zhai, Los Altos, CA (US); Philip Quinn, Christchurch (NZ)

(73) Assignee: Google Inc., Mountain View, CA (US)

( * ) Notice: Subject to any disclaimer, the term of this patent is extended or adjusted under 35 U.S.C. 154(b) by 44 days.

(21) Appl. No.: 13/663,172

(22) Filed: Oct. 29, 2012

Related U.S. Application Data

(60) Provisional application No. 61/702,681, filed on Sep. 18, 2012.

(51) Int. Cl.
  G06F 3/048 (2013.01)
  G06F 3/0482 (2013.01)

(52) U.S. Cl.
  CPC .................................. *G06F 3/0482* (2013.01)

(58) Field of Classification Search
  None
  See application file for complete search history.

(56) References Cited

U.S. PATENT DOCUMENTS

| | | | |
|---|---|---|---|
| 5,724,457 A * | 3/1998 | Fukushima | 382/311 |
| 5,896,321 A | 4/1999 | Miller et al. | |
| 6,286,064 B1 | 9/2001 | King et al. | |
| 6,292,179 B1 | 9/2001 | Lee | |
| 6,377,965 B1 | 4/2002 | Hachamovitch et al. | |
| 6,801,190 B1 | 10/2004 | Robinson et al. | |
| 7,030,863 B2 | 4/2006 | Longe et al. | |
| 7,042,443 B2 | 5/2006 | Woodard et al. | |
| 7,075,520 B2 | 7/2006 | Williams | |
| 7,088,345 B2 | 8/2006 | Robinson et al. | |
| 7,098,896 B2 | 8/2006 | Kushler et al. | |
| 7,145,554 B2 | 12/2006 | Bachmann | |
| 7,151,530 B2 | 12/2006 | Roeber et al. | |
| 7,199,786 B2 | 4/2007 | Suraqui | |
| 7,250,938 B2 | 7/2007 | Kirkland et al. | |
| 7,251,367 B2 | 7/2007 | Zhai | |
| 7,277,088 B2 | 10/2007 | Robinson et al. | |
| 7,293,231 B1 | 11/2007 | Gunn et al. | |
| 7,453,439 B1 | 11/2008 | Kushler et al. | |
| 7,508,324 B2 | 3/2009 | Suraqui | |
| 7,706,616 B2 | 4/2010 | Kristensson et al. | |
| 7,716,579 B2 | 5/2010 | Gunn et al. | |
| 7,750,891 B2 | 7/2010 | Stephanick et al. | |

(Continued)

OTHER PUBLICATIONS

Trnka et al., "The Keystroke Savings Limit in Word Prediction for AAC", 2005 University of Delaware, 5 pps.

(Continued)

*Primary Examiner* — Matt Kim
*Assistant Examiner* — Hua Lu
(74) *Attorney, Agent, or Firm* — Leydig, Voit & Mayer, LTD.

(57) ABSTRACT

A computing device receives an indication of user input that corresponds to a series of one or more characters. The computing device determines, based at least in part on the series of one or more characters, a plurality of character strings. The computing device determines a score for each respective character string based at least in part on a probability in a particular language of the respective character string occurring, an estimate of time to be saved by a user if the user were to select the respective character string, and an estimate of time to be expended by the user to analyze the respective character string. The computing device outputs at least a portion of the plurality of character strings. The portion of the plurality of character strings is determined based at least in part on the score for each respective character string from the plurality of character strings.

25 Claims, 6 Drawing Sheets

(56) References Cited

U.S. PATENT DOCUMENTS

| | | | |
|---|---|---|---|
| 7,793,228 | B2 | 9/2010 | Mansfield et al. |
| 7,921,361 | B2 | 4/2011 | Gunn et al. |
| 8,036,878 | B2 | 10/2011 | Assadollahi |
| 8,135,582 | B2 | 3/2012 | Suraqui |
| 8,645,825 | B1 * | 2/2014 | Cornea et al. ............ 715/257 |
| 2006/0119582 | A1 | 6/2006 | Ng et al. |
| 2006/0176283 | A1 | 8/2006 | Suraqui |
| 2006/0265208 | A1 * | 11/2006 | Assadollahi ............... 704/9 |
| 2007/0061753 | A1 * | 3/2007 | Ng et al. ............... 715/816 |
| 2008/0316183 | A1 | 12/2008 | Westerman et al. |
| 2009/0216690 | A1 * | 8/2009 | Badger et al. ............ 706/11 |
| 2010/0325100 | A1 * | 12/2010 | Forstall et al. ........... 707/706 |
| 2011/0087961 | A1 * | 4/2011 | Fitusi et al. ............ 715/261 |
| 2011/0099506 | A1 | 4/2011 | Gargi et al. |
| 2011/0202876 | A1 | 8/2011 | Badger et al. |
| 2012/0036469 | A1 | 2/2012 | Suraqui |
| 2012/0117101 | A1 | 5/2012 | Unruh |
| 2012/0167009 | A1 * | 6/2012 | Davidson et al. ............ 715/816 |
| 2012/0297332 | A1 * | 11/2012 | Changuion et al. ........... 715/780 |
| 2014/0067372 | A1 * | 3/2014 | Pasquero et al. ............ 704/9 |

OTHER PUBLICATIONS

"Penfriend XL", Penfriend Ltd. 2012 [online]. Retrieved from the Internet: <http://www.penfriend.biz/pf-xl.html> 2 pps.

Serrano, "TouchPal Keyboard App for Android Phones—Review", Oct. 14, 2011, LawyerTechReview.com. Retrieved from the Internet: <http://lawyertechreview.com/2011/touchpal-keyboard-android-phone-review/> 12 pps.

U.S. Appl. No. 60/430,338, by Daniel Suraqui, filed Nov. 29, 2002.

U.S. Appl. No. 60/505,724, by Daniel Suraqui, filed Sep. 22, 2003.

* cited by examiner

TEXT INPUT SUGGESTION RANKING

This application claims the benefit of U.S. Provisional Patent Application No. 61/702,681, filed Sep. 18, 2012, the entire content of which is hereby incorporated by reference.

BACKGROUND

A computing device may receive text input from a user. The text input may include a series of characters. As the computing device receives the text input, the computing device may output the series of characters for display at a display device. When the user inputs one or more characters of a character string, the computing device may display a set of one or more suggested character strings. The suggested character strings may be character strings that the user is attempting to input by inputting the one or more characters of the character string. If the computing device receives an indication that the user has selected one of the suggested character strings, the computing device may replace the one or more already-entered characters of the character string with the selected suggested character string. In some circumstances, selecting the suggested character string may allow for speedier text entry than entering the remaining characters of the suggested character string or editing the already-entered characters in order to form the suggested character string. In this way, the computing device may enable the user to accelerate his/her input of text by providing such suggested character strings.

SUMMARY

In one example, this disclosure describes a method that comprises receiving, by a computing device, an indication of user input corresponding to a series of one or more characters. The method also comprises, in response to receiving the indication of the user input, determining, by the computing device, a plurality of character strings that are based at least in part on the series of one or more characters. In addition, the method comprises determining, by the computing device, a respective score for each respective character string from the plurality of the character strings. For each respective character string from the plurality of character strings, the score for the respective character string is based at least in part on a probability in a particular language of the respective character string occurring given zero or more characters that precede the respective character string, an estimate of time saved by a user if the user were to select the respective character string, and an estimate of time to be expended by the user to analyze the respective character string. The method also comprises outputting, by the computing device and for display at a screen, at least a portion of the plurality of character strings, the portion of the plurality of character strings being determined based at least in part on the respective score for each respective character string from the plurality of character strings.

In another aspect, this disclosure describes a computing device comprising one or more processors configured to determine, in response to receiving an indication of user input that corresponds to a series of one or more characters, a plurality of character strings based at least in part on the series of one or more characters. The one or more processors are also configured to determine a respective score for each respective character string from the plurality of the character strings. For each respective character string from the plurality of character strings, the respective score for the respective character string is based at least in part on a probability in the particular language of the respective character string occurring given zero or more characters that precede the respective character string, an estimate of time saved by a user if the user were to select the respective character string, an estimate of time to be expended by the user to analyze the respective character string, and an estimate of time to be expended by the user to select the respective character string. The one or more processors are also configured to output, for display at a screen, at least a portion of the plurality of character strings, the portion of the plurality of character strings being determined based at least in part on the respective score for each respective character string from the plurality of character strings.

In another aspect, this disclosure describes a computer-readable storage medium that stores instructions that, when executed by one or more processors of a computing device, cause the computing device to determine, in response to receiving an indication of user input that corresponds to a series of one or more characters, a plurality of character strings based at least in part on the series of one or more characters. The instructions also cause the computing device to determine a respective score for each respective character string from the plurality of the character strings. For each respective character string from the plurality of character strings, the respective score for the respective character string is based at least in part on a probability in a particular language of the respective character string occurring given zero or more characters that precede the respective character string, an estimate of time saved by a user if the user were to select the respective character string from a list of suggested character strings, an estimate of time to be expended by the user to analyze the respective character string in the list of suggested character strings, and an estimate of time to be expended by the user to select the respective character string from the list of suggested character strings. The instructions also cause the computing device to output at least a portion of the character strings from the plurality of character strings in a sequence that is based at least in part on the respective scores for the character strings.

One or more examples are set forth in the accompanying drawings and the description below. Other features, objects, and advantages will be apparent from the description, drawings, and claims.

DETAILED DESCRIPTION

Figure 1:
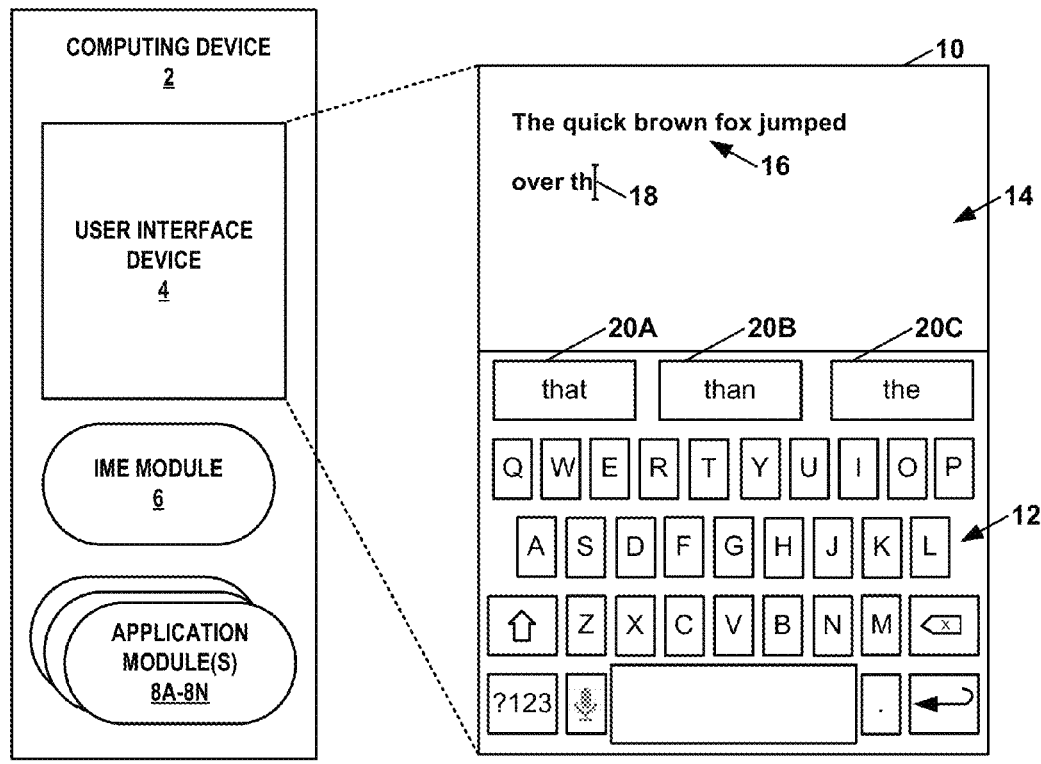
FIG. 1 is a conceptual diagram that illustrates an example computing device in accordance with one or more techniques of this disclosure.

In some implementations, a computing device may receive an indication of user input corresponding to one or more characters. In response to receiving the indication of the user input, the computing device may output a list of one or more suggested character strings in a graphical user interface (GUI) displayed at a display device. If the computing device receives an indication that the user has selected one of the suggested character strings, the computing device may replace the character string that the user is currently entering or editing with the suggested character string. This may save time for the user by omitting the need to input the remaining characters of the selected suggested character string or to perform a series of editing actions to replace the already-entered characters with the selected suggested character string.

However, there may be circumstances where it would take the user longer to select a desired character string from the list of suggested character strings than it would take for the user to type the remaining characters of the desired character string. For instance, the user does not save any time if it takes less time for the user to type the remaining characters of the desired character string than the time it takes for the user to review the list of suggested character strings and to perform a gesture to select the character string from the list of suggested character strings. For example, if the user is inputting the character string "the" and the user has already entered the letters "th", it may take the user more time to select the character string "the" from the list of suggested character strings than it would take for the user to type the character "e". For this reason, the inclusion of a particular character string in the list of suggested character strings may not be particularly useful to the user, even if the particular character string is the character string that is most likely to occur in a particular language. In accordance with the techniques of this disclosure, the computing device may estimate how useful it would be to the user to include particular character strings in the list of suggested character strings, and accordingly output a suggested character string based at least in part on such estimates.

More specifically, the computing device may estimate the usefulness of a suggested character string in various ways. For example, the computing device may determine a score for a suggested character string based at least in part on a plurality of factors. These factors may include a probability in a particular language of the suggested character string occurring given zero or more characters that precede the respective character string. In addition, the factors may include an estimate of time saved by a user if the user were to select the suggested character string, an estimate of time expended by the user to analyze the suggested character string, and an estimate of time expended by the user to select the suggested character string. By determining scores for the suggested character strings based at least in part on such factors, the suggested character strings outputted by the computing device may be the suggested character strings that are most likely to accelerate the user's entry of characters, even if the suggested character strings are not the character strings most likely to be entered in the particular language.

FIG. 1 is a conceptual diagram that illustrates an example computing device 2 in accordance with one or more techniques of this disclosure. Computing device 2 may be one of various types of computing devices. For example, computing device 2 may be a mobile device, such as a mobile telephone, a tablet computer, a notebook or laptop computer, a personal media player, a portable gaming device, or another type of computing device designed for mobility. In other examples, computing device 2 may be other types of computing devices, such as desktop computers, point of sale devices, televisions, gambling devices, appliances, in-car computers, and other types of computing devices.

In the example of FIG. 1, computing device 2 includes at least one user interface device 4. User interface device 4 may display graphical data and detect the presence of one or more input objects, such as fingers or styli. Because user interface device 4 may display graphical data and detect the presence of one or more input objects, user interface device 4 may be referred to as a presence-sensitive display device. User interface device 4 may be implemented using various technologies. For example, user interface device 4 may be implemented using a resistive touchscreen, a surface acoustic wave touchscreen, a capacitive touchscreen, a projective capacitance touchscreen, an acoustic pulse recognition touchscreen, or another touchscreen technology. In some examples, user interface device 4 may be able to detect the presence of an input object without the input object physically touching user interface device 4. Rather, in such examples, user interface device 4 may be able to detect the presence of the input object when the input object is sufficiently close to user interface device 4 that user interface device 4 is able to detect the presence of the input object.

User interface device 4 may be operatively coupled to computing device 2 in various ways. For example, user interface device 4 may be integrated into a housing of computing device 2 and may be connected to computing device 2 via one or more internal connectors. In another example, user interface device 4 may be external to a housing of computing device 2 and may communicate with computing device 4 via one or more external cables and/or communication networks.

Although the example of FIG. 1 assumes that user interface device 4 is a presence-sensitive display device, the techniques of this disclosure are not so limited. In other examples, user interface device 4 may be a display device that does not detect the presence of input objects.

In addition, computing device 2 may include an input method editor (IME) module 6. IME module 6 may receive indications of user input and determine a character string that corresponds to the user input. IME module 6 may receive the indications of user input in various ways. For example, IME module 6 may receive the indications of user input from a physical keyboard. In another example, IME module 6 may receive the indications of the user input as indications of tapping gestures at virtual keys on a virtual (e.g., onscreen) keyboard. In another example, IME module 6 may receive the indications of the user inputs as indications of sliding gestures on a virtual keyboard. IME module 6 may determine the character string in various languages, such as English, Russian, French, Japanese, Korean, Chinese, Hindi, Arabic, and so on.

Computing device 2 also includes application module(s) 8A-8N (collectively, "application module(s) 8"). Execution of instructions in application module(s) 8 may cause computing device 2 to provide various applications (e.g., "apps"). Computing device 2 may provide the character string determined by IME module 6 to one or more of application module(s) 8.

In the example of FIG. 1, computing device 2 outputs a graphical user interface (GUI) 10 for display at user interface device 4. In general, a GUI may be a type of user interface that allows a user to use images to interact with a computing device. GUI 10 may include a virtual keyboard 12. Virtual keyboard 12 may include a set of virtual keys. In addition, GUI 10 may include a text display area 14. Text display area 14 may display text 16 that has been entered by a user. For instance, computing device 2 may output text 16 for display in text display area 14 in response to one or more indications of user input at virtual keyboard 12. In addition, text display area 14 may include a cursor 18 that indicates an insertion point within text 16. Computing device 2 may insert characters into text 16 at the insertion point or delete characters of text 16 adjacent to the input point.

Furthermore, GUI 10 includes one or more suggested character strings 20A-20C (collectively, "suggested character strings 20"). Computing device 2 may receive an indication of a user input to select one of suggested character strings 20. In response to receiving the indication of the user input to select one of suggested character strings 20, computing device 2 may replace a relevant series of one or more characters with the selected one of suggested character strings 20. The relevant series of characters may be the characters of the character string that is currently being entered or edited. In the example of FIG. 1, if computing device 2 receives an indication of a user input to select suggested character string 20A, computing device 2 may replace the relevant series of one or more characters (i.e., "th") with the character string "that".

In response to receiving an indication of user input that corresponds to one or more characters, IME module 6 may determine, based at least in part on the relevant series of one or more characters, a plurality of character strings. For ease of explanation, this disclosure may refer to this plurality of character strings as the plurality of candidate character strings. IME module 6 may determine the plurality of candidate character strings in various ways. For example, IME module 6 may determine the plurality of candidate character strings such that for each respective character string in a lexicon, the respective character string is in the plurality of candidate character strings if the respective character string has a prefix that matches the relevant series of one or more characters. For instance, if the relevant series of one or more characters is "th", the plurality of candidate character strings may include the character strings "than," "that," "the," "theatre," "themselves," "thermal," "thermonuclear," "thereat," "threat," and so on.

Furthermore, the user may make one or more typographical errors when inputting the relevant series of one or more characters. Accordingly, in some examples, IME module 6 may include candidate character strings that the user may have intended to input when the user inputted the relevant series of one or more characters. For example, if the relevant series of one or more characters is "cobtr", IME module 6 may include the character string "control" in the plurality of candidate character strings.

In some examples, IME module 6 may determine whether to include a particular character string in the plurality of candidate character strings based at least in part on spatial distances between points on user interface device 4 indicated by actual tapping gestures and points on user interface device 4 that would have been indicated by tapping gestures if the user had perfectly positioned the tapping gestures to enter the particular character string. For example, the user may perform a first tapping gesture near a right visual edge of the "r" key, then perform tapping gestures near the centers of the "h" and "a" keys. In this example, IME module 6 may determine, based at least in part on the small spatial distance of the first tapping gesture to the "t" key, that the user may be attempting to enter the character string "thank". Accordingly, IME module 6 may include the character string "thank" in the plurality of candidate character strings.

IME module 6 may determine a utility score for each respective character string from the plurality of candidate character strings. The utility scores for the candidate character strings may be correlated with how useful it would be to the user to output the candidate character strings for display as suggested character strings. IME module 6 may determine the utility score for each respective character string from the plurality of candidate character strings based at least in part on a plurality of factors. These factors may include a first factor for the respective character string.

The first factor for the respective character string may be based on various types of data. For example, the first factor may be based, at least in part on a probability in a particular language of the respective character string occurring given zero or more characters that precede the respective character string. This probability of the respective character string may be the probability in the particular language of the character string occurring, given the n−1 words that precede the respective character string. Hence, this probability may be referred to herein as an n-gram probability for the respective character string. Hence, a bi-gram probability in the particular language of the respective character string may indicate the probability in the particular language of the respective character string occurring, given the one word that immediately precedes the respective character string. A tri-gram probability in the particular language of the respective character string may indicate the probability in the particular language of the respective character string occurring, given the two words that immediately precede the respective character string. A uni-gram probability in the particular language of the respective character string may indicate the probability in the particular language of the respective character string occurring without taking any preceding words or characters into account.

Computing device 2 may determine the probabilities in the particular language of the respective character string occurring based on one or more dictionaries. Each of the dictionaries may indicate probabilities in the particular language of a character string occurring given the n−1 preceding words. Different dictionaries may indicate different probabilities. For instance, a first dictionary may indicate the probabilities of particular character strings occurring in the usage patterns of the American public as a whole. A second dictionary may indicate the probabilities of particular character strings occurring in the usage patterns of an individual user. In examples where computing device 2 determines, based on multiple dictionaries, the probability in a particular language of the respective character string occurring, computing device 2 may determine the probability in the particular language of the respective character string occurring based at least in part on a weighted average of the probabilities indicated by the dictionaries.

Alternatively or in addition to the probability in the particular language of the respective character string, computing device 2 may determine the first factor for the respective character string based on one or more other types of data. For example, computing device 2 may determine the first factor based at least in part on a spatial score for the respective character string. The spatial score for the respective character string may be correlated with (e.g., a sum of) the spatial distances between points at which user interface device 4 detected an input object during input of the characters and points at which user interface device 4 would detect the input object if the user were inputting the respective character string perfectly.

In another example, the first factor for the respective character string may be based at least in part on normalized probabilities of other candidate character strings. For instance, IME module 6 may determine the first factor for the respective character string based at least in part on a value equal to the probability in the particular language of the respective character string divided by a sum or multiplication product of the probabilities in the particular language of the candidate character strings occurring.

In another example, the first factor for the respective character string may be based at least in part on (e.g., weighted based on) the difference in the number of characters between the already-entered characters and the respective character string. In another example, the first factor for the respective character string may be based at least in part on an edit distance (e.g., a Hamming distance) between the entered characters and a prefix of the respective character string that has the same number of characters as the entered characters. The edit distance may indicate the number of changes required to change the entered characters into the prefix. For instance, the first factor for the respective character string may be weighted based at least partially on the edit distance.

Furthermore, for each respective character string from the plurality of candidate character strings, the utility score for the respective character string may be based at least in part on a second factor for the respective character string. The second factor for the respective character string may be an estimate of time saved by the user if the user were to select the respective character string. If IME module 6 determines that the user is likely to save a good deal of time by selecting the respective character string, IME module 6 may assign a high second factor to the respective character string. Consequently, character strings that save the user more time may have higher utility scores.

In some instances, the time saved by selecting a particular character string from a list of suggested character strings may be large. Nevertheless, the probability of the user entering that particular character string may be small. The utility score of the particular character string may take into account both the probability of the user entering the particular character string and the time saved by selecting the particular character string from the list of suggested character strings. In this way, IME module 6 may not assign a high utility score to the particular character string if the probability of the particular character string occurring is small, even if the time saved by selecting the particular character string is large. Likewise, IME module 6 may not assign a high utility score to the particular character string if the probability of particular character string occurring is large, even if the time saved by selecting the particular character string is small.

For example, if the user is attempting to enter the character string "thoughtlessness" and the user has entered the characters "th", selecting the character string "thoughtlessness" from a list of suggested character strings may save the user a good deal of time. However, the probability that the user is entering the character string "thoughtlessness" may be small. Accordingly, in this example, IME module 6 may determine that the character string "thoughtlessness" has a lower utility score than more commonly used character strings, such as "thank" and "that".

In some examples, the utility score for each respective character string from the plurality of candidate character strings is also based on a third factor for the respective character string. The third factor for the respective character string may be an estimate of time expended by the user to analyze the respective character string, as discussed further below. Furthermore, in some examples, the utility score for each respective character string from the plurality of candidate character strings is also based on a fourth factor for the respective character string. The fourth factor for the respective character string may be an estimate of time expended by the user to select the respective character string, as discussed further below.

In some examples where IME module 6 determines the utility scores for the candidate character strings based on the four factors described above, IME module 6 may determine, for each respective character string from the plurality of candidate character strings, the utility score for the respective character string based at least in part by calculating $P*S-(D+P*M)$. In this formula, P denotes a factor that is based at least in part on the probability in the particular language of the respective character string occurring given the zero or more characters that precede the respective character string, where S denotes the estimate of time saved by the user if the user were to select the respective character string, where D denotes the estimate of time to be expended by the user to analyze the respective character string, and where M denotes the estimate of time to be expended by the user to select the respective character string. For instance, the utility score of a candidate character string may be equal to $P*S-(D+P*M)$.

In some examples, the first, second, third, and fourth factors may be associated with weights. The weights may prioritize particular ones of the factors over other ones of the factors. For example, if the weight associated with the first factor is relatively great as compared to the weight associated with the second factor, IME module 6 may assign utility scores to candidate character strings such that the probabilities of the user entering the candidate character strings are more important than the amounts of time saved by selecting the candidate character strings from a list of candidate character strings. In some examples, the weights may be user configurable or vendor configurable.

After IME module 6 determines the utility scores for the candidate character strings, IME module 6 may output, for display at user interface device 4, at least a portion of the plurality of candidate character strings. IME module 6 may determine the portion of the plurality of candidate character strings based at least in part on the utility score for each respective character string from the plurality of character strings. The portion of the candidate character strings may include one or more of the candidate character strings. For instance, in the example of FIG. 1, IME module 6 outputs the three candidate character strings with the highest utility scores as suggested character strings 20.

Furthermore, IME module 6 may output the character strings from the plurality of candidate character strings in a sequence that is based at least in part on the utility scores for the candidate character strings. For instance, in the example of FIG. 1, IME module 6 may output a candidate character string with the highest utility score as the leftmost suggested character string, a candidate character string with the second highest utility score as the middle suggested character string, and a candidate character string with the third highest utility score as the rightmost suggested character string.

Some users are more likely to notice the middle suggested character string (i.e., suggested character string 20B) than the leftmost or rightmost suggested character strings (i.e., suggested character strings 20A and 20C). Accordingly, in some examples, IME module 6 may, for each respective character string from the plurality of candidate character strings, output the respective character string at a position that is easiest for the user to select if the utility score for the respective character string is higher than the utility scores for each other character string from the plurality of candidate character strings. For example, IME module 6 may output a candidate character string with the highest utility score as the middle suggested character string, a candidate character string with the second highest utility score as the leftmost suggested character string, and a candidate character string with the third highest utility score as the rightmost suggested character string.

In some examples, IME module 6 may determine, based at least in part on the utility scores for the candidate character strings, a particular character string from the plurality of candidate character strings. The particular character string may have the highest utility score of the candidate character strings. Computing device 2 may then receive an indication of a user input. This user input may correspond to a word delimiter, such as space character or punctuation mark. In response to receiving the indication of the user input, IME module 6 may replace within GUI 10 the one or more already-entered characters with the particular character string. For example, the user may have already entered the characters "th". In this example, computing device 2 may then receive an indication of a user input, such as a tapping gesture at a spacebar virtual key of virtual keyboard 12. In this example, the highest-scoring candidate character string may be "that". In response to receiving this indication of the user input, computing device 2 may replace the already-entered characters "th" with the character string "that". In this way, the user may not need to explicitly select a suggested character string displayed in GUI 10. In some examples where computing device 2 automatically replaces the already-entered characters with a particular character string in response to user input that corresponds to a word delimiter, computing device 2 may determine the particular character string and replace the already-entered characters with the particular character string without displaying the particular character string, or in some instances any character strings, in a set of suggested character strings.

Furthermore, in some examples, IME module 6 may output at least a portion of the plurality of candidate character strings as a set of suggested character strings (e.g., suggested character strings 20). IME module 6 may determine this portion of the candidate character strings based on the utility scores described above. The utility scores described above may be referred to herein as the first scores for the candidate character strings. In this example, IME module 6 may also determine a second score for each respective candidate character string from the plurality of candidate character strings. For ease of explanation, the second scores for the candidate character strings may be referred to herein as the language scores for the candidate character strings. For each respective candidate character string from the plurality of candidate character strings, the language score for the respective candidate character string may be based at least in part on a probability in a particular language of the respective character string occurring. In this example, the language score for the respective candidate character string is not based on the second, third, or fourth factors described above. IME module 6 may determine, based at least in part on the language scores for the candidate character strings, a particular character string from the plurality of candidate character strings. For instance, IME module 6 may determine a candidate character string with the highest language score.

Continuing the example of the previous paragraph, IME module 6 may receive an indication of a user input. If the indication of the user input corresponds to a selection of one of the suggested character strings, IME module 6 may replace within GUI 10 the relevant series of one or more already-entered characters with the selected one of the suggested character strings. If the indication of the user input corresponds to an auto-replace gesture, IME module 6 may replace within GUI 10 the relevant series of one or more already-entered characters with the particular character string. IME module 6 may receive an indication of a user input that corresponds to an auto-replace gesture if the user performs a tapping gesture at the spacebar virtual key of virtual keyboard 12, a tapping gesture at the enter virtual key of virtual keyboard 12, a tapping gesture at another virtual key of virtual keyboard 12, or another type of gesture at user interface device 4. IME module 6 may determine the language scores for the candidate character strings, determine a particular character string based at least in part on the language scores of the candidate character strings, and replace the relevant series of one or more already-entered characters with the particular character string in response to the indication of the auto-replace gesture. IME module 6 may do so because the second, third, and fourth factors (i.e., an estimate of time saved by the user if the user were to select the particular character string, an estimate of the time expended to analyze the respective character string, and an estimate of time expended by the user to select the respective character string) may not be relevant because the user does not analyze or select suggested character strings when the user elects to perform the auto-replace gesture.

Thus, in accordance with the techniques of this disclosure, computing device 2 may receive an indication of user input. The user input may correspond to a series of one or more characters. In response to receiving the indication of the user input, computing device 20 may determine a plurality of character strings based at least in part on the series of one or more characters. Computing device 2 may determine a respective score for each respective character string from the plurality of the character strings. For each respective character string from the plurality of character strings, the respective score for the respective character string is based at least in part on a probability in a particular language of the respective character string occurring given zero or more characters that precede the respective character string, an estimate of time to be saved by a user if the user were to select the respective character string, and an estimate of time to be expended by the user to analyze the respective character string. Computing device 2 may output, for display at a screen operatively coupled to computing device 2 (e.g., user interface device 4), at least a portion of the plurality of character strings. Computing device 2 may determine the portion of the plurality of character strings based at least in part on the score for each respective character string from the plurality of character strings.

Figure 2:
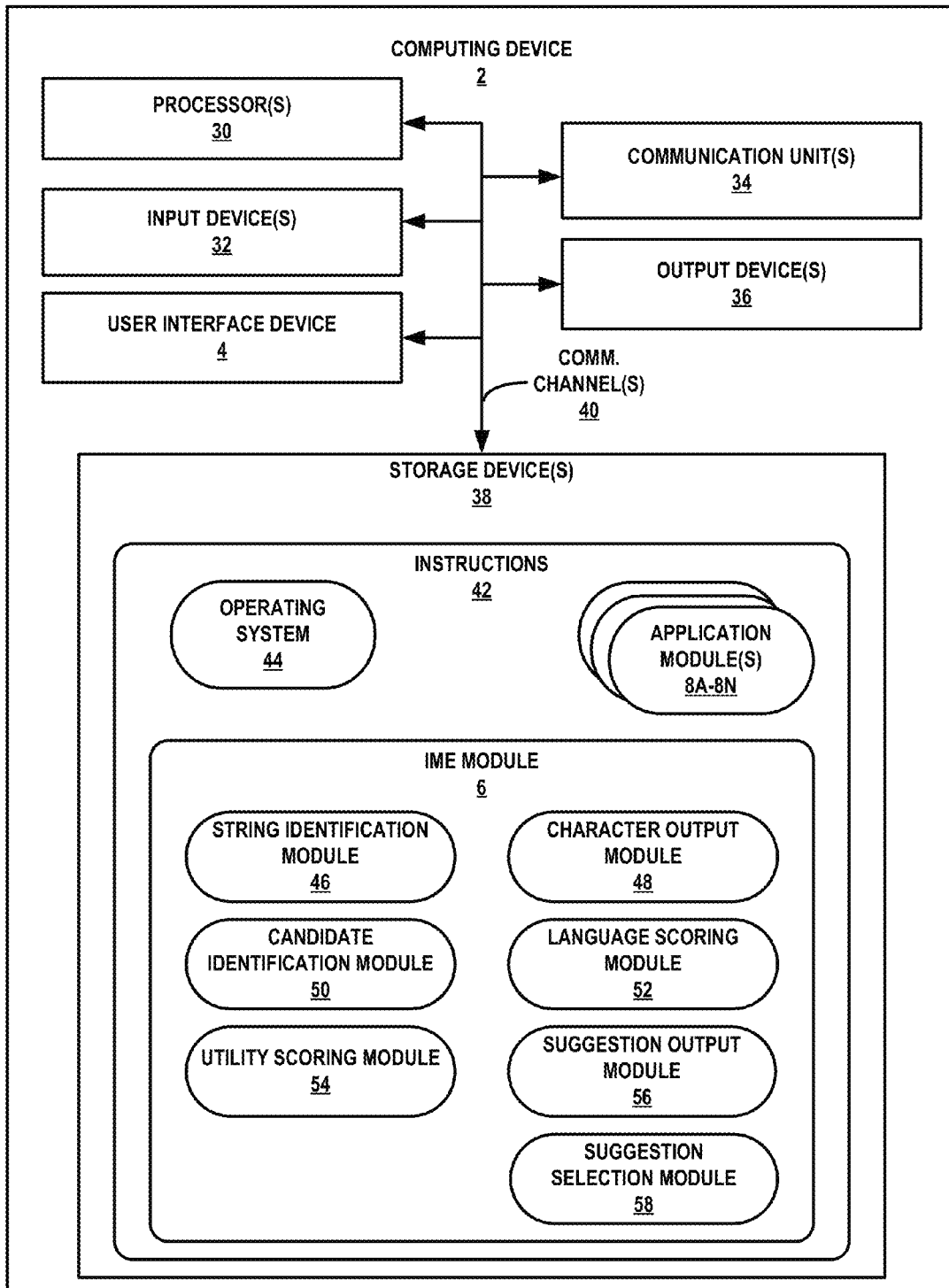
FIG. 2 is a block diagram that illustrates an example configuration of a computing device, in accordance with one or more techniques of this disclosure.

FIG. 2 is a block diagram that illustrates an example configuration of computing device 2, in accordance with one or more aspects of this disclosure. For purposes of illustration, FIG. 2 is described with reference to FIG. 1. FIG. 2 illustrates only one particular example of computing device 2, and many other example configurations of computing device 2 exist.

As shown in the example of FIG. 2, computing device 2 includes one or more processors 30, one or more input devices 32, one or more communication units 34, one or more output devices 36, one or more storage devices 38, one or more communication channels 40, and user interface device 4. Computing device 2 may include many other components. For example, computing device 2 may include physical buttons, microphones, speakers, communication ports, and so on.

Communication channels 40 may interconnect each of the components 30, 32, 34, 36, 38, and 4 for inter-component communications (physically, communicatively, and/or operatively). In some examples, communication channels 40 may include a system bus, a network connection, an inter-process communication data structure, or any other method for communicating data.

One or more storage devices 38 within computing device 2 may store information required for use during operation of computing device 2. Storage devices 38, in some examples, have the primary purpose of being a short term and not a long-term computer-readable storage medium. Storage devices 38 may be volatile memory and therefore not retain stored contents if powered off. Examples of volatile memories may include random access memories (RAM), dynamic random access memories (DRAM), static random access memories (SRAM), and other forms of volatile memories known in the art. Storage devices 38 may further be configured for long-term storage of information as non-volatile memory space and retain information after power on/off cycles. Examples of non-volatile memory configurations may include magnetic hard discs, optical discs, floppy discs, flash memories, or forms of electrically programmable memories (EPROM) or electrically erasable and programmable (EEPROM) memories. In some examples, processors 30 on computing device 2 read and execute instructions 42 stored by storage devices 38.

Computing device 2 may include one or more input devices 32 that computing device 2 uses to receive input. Examples of input are tactile, audio, and video input. Input devices 32 may include presence-sensitive screens, touch-sensitive screens, mice, keyboards, voice responsive systems, video cameras, microphones or other types of devices for detecting input from a human or machine.

Communication units 34 may enable computing device 2 to send data on and receive data from a communications network, such as a local area network or the Internet. In some examples, communication units 34 may include wireless transmitters and receivers that enable computing device 2 to communicate wirelessly with the communications network.

Output devices 36 may generate output. Examples of output are tactile, audio, and video output. Output devices 36 may include presence-sensitive screens, sound cards, video graphics adapter cards, speakers, cathode ray tube (CRT) monitors, liquid crystal displays (LCD), or other types of devices for generating output.

Storage devices 38 may store data, such as computer-executable instructions 42. Processors 30 may read instructions 42 from storage devices 38 and execute instructions 42. Execution of instructions 42 by processors 30 may configure or cause computing device 2 to provide at least some of the functionality ascribed in this disclosure to computing device 2. As shown in the example of FIG. 2, instructions 42 include operating system 44, IME module 6, and application modules 8A-8N. Execution of instructions in operating system 44 may cause computing device 2 to perform various functions to manage hardware resources of computing device 2 and to provide various common services for other computer programs. Execution of instructions in application modules 8 may cause computing device 2 to provide various applications (e.g., "apps").

In the example of FIG. 2, IME module 6 includes a string identification module 46, a character output module 48, a candidate identification module 50, a language scoring module 52, a utility scoring module 54, a suggestion output module 56, and a suggestion selection module 58. The example of FIG. 2 describes string identification module 46, character output module 48, candidate identification module 50, language scoring module 52, utility scoring module 54, suggestion output module 56, and suggestion selection module 58 as "modules." However, in other examples, the functionality of these modules is not implemented in a modular style. Furthermore, in some examples, the functionality of these modules is not provided by instructions within an IME module. For ease of explanation, this disclosure may describe the modules of IME module 6 performing particular actions. In some examples, this disclosure may indicate that a module performs a particular action when processor(s) 30 execute instructions of the module that cause or configure computing device 2 to perform the particular action.

String identification module 46 may determine a character string that corresponds to indications of user input. If IME module 6 receives an indication of a user input that corresponds to entry of a character, character output module 48 may output the character for display at GUI 10 and advance cursor 18 such that cursor 18 immediately follows the character. In addition, candidate identification module 50 may determine, based at least in part on a relevant series of characters, a set of candidate character strings. The relevant series of characters may include characters in a character string that is currently being entered or edited. Cursor 18 may be at the end of in the midst of the character string that is currently being entered or edited.

After candidate identification module 50 identifies the set of candidate character strings, language scoring module 52 may determine a language score for each respective character string in the set of candidate character strings. For each respective character string from the set of candidate character strings, the language score for the candidate character string may be the probability of the respective character string occurring in a particular language given the n preceding character strings, where n is an integer.

In addition, utility scoring module 54 may calculate utility scores for the candidate character strings. In some examples, utility scoring module 54 may calculate, for each respective character string in the set of candidate character strings, the utility score for the respective character string based at least in part on the language score for the respective character string. Furthermore, utility scoring module 54 may determine the utility score for the respective character string based at least in part on a second factor. The second factor for the respective character string may be an estimate of time saved by the user if the user were to select the respective character string from a list of suggested character strings.

Utility scoring module 54 may determine the second factor for the respective character string in various ways. For example, utility scoring module 54 may use the difference in length between the respective character string and the relevant series of one or more already-entered characters as an estimate of time saved by the user if the user were to select the respective character string. In other words, utility scoring module 54 may determine the second factor for the respective character string based at least in part on a length of the respective character string minus a length of the relevant series of one or more already-entered characters.

In another example, utility scoring module 54 may determine the second factor for the respective character string based at least in part on a number of user input actions required to replace the relevant series of one or more characters with the respective character string if the user does not select the respective character string from a list of suggested character strings in GUI 10. The user input actions may include tapping gestures on the virtual keys that correspond to the remaining, un-entered characters of the respective character string. In some examples where the relevant series of one or more already-entered characters is not a prefix of the respective character string, the user input actions required to replace the relevant series of one or more already-entered characters with the respective character string may include one or more tapping gestures at a virtual backspace key of virtual keyboard 12 (FIG. 1) or the repositioning of cursor 18 and subsequent actions to insert or delete characters at locations in the already-entered characters.

In another example, utility scoring module 54 may determine the second factor for the respective character string based at least in part on estimated time durations for user input actions required to replace the relevant series of one or more already-entered characters with the respective character string. The estimated time durations for the user input actions may be estimates of lengths of time that the user is likely to take to perform the user input actions. In this example, utility scoring module 54 may determine the estimated time durations for the user input actions in various ways. For example, utility scoring module 54 may determine the estimated time durations for the user input actions based at least in part on lengths of time that the user has historically taken to perform the user input actions. In another example, utility scoring module 54 may determine the estimated time durations for the user input actions based at least in part on a speed at which the user is currently typing.

In some examples, the utility score for each respective character string from the plurality of candidate character strings is also based on a third factor for the respective character string. The third factor for the respective character string may be an estimate of time expended by the user to analyze the respective character string. Utility scoring module 54 may determine the third factor for the respective character string in various ways. For example, utility scoring module 54 may determine the third factor for the respective character string based at least in part on how many of the candidate character strings are output for display in a screen (e.g., user interface device 4). In this example, the third factor for the respective character string may be higher if there are more suggested character strings output for display in the screen than if there are fewer suggested character strings output for display in the screen. Utility scoring module 54 may do so because it may take the user longer to review longer lists of suggested character strings than shorter lists of suggested character strings. In some examples, utility scoring module 54 may determine the third factor for the respective character string based at least in part on the order in which the suggested character strings are displayed in GUI 10.

In another example, utility scoring module 54 may determine the third factor for the respective character string based at least in part on a frequency with which the respective character string is output as a suggested character string. If IME module 6 frequently outputs the respective character string as a suggested character string, utility scoring module 54 may assign a lower third factor to the respective character string than if IME module 6 seldom outputs the respective character string as a suggested character string. Utility scoring module 54 may do so because the user may be more likely to spend less time analyzing the respective character string if the user frequently sees the respective character string as a suggested character string. The user may be more likely to select the respective character string from the list of suggested character strings if the user does not need to spend much time analyzing the respective character string.

In some examples, utility scoring module 54 may determine the second and/or third factors for the respective character strings based at least in part on calibrated models of user interaction. Example calibrated models of user interaction may include, but are not limited to, Fitts' law and the Hick-Hyman law. Fitts' law is a model of human movement that predicts the time required for a human to move an object, such as a finger or stylus, to a target area, given a distance to the target area and the size of the target area. The Hick-Hyman law describes the amount of time it takes for a human to make a decision as a result of the possible choices presented to the human.

Furthermore, in some examples, the utility score for each respective character string from the plurality of candidate character strings is also based on a fourth factor for the respective character string. The fourth factor for the respective character string may be an estimate of time expended by the user to select the respective character string. In some examples, utility scoring module 54 may determine the fourth factor for the respective character string based at least in part on a user input mode that the user is using to provide the user input. For example, if the user is using a large virtual keyboard (e.g., on a tablet computer) to provide the user input, it may take the user more time to move an input object, such as a finger or stylus, to a region of user interface device 4 that displays the suggested character strings than if the user is using a small virtual keyboard (e.g., on a smartphone). In another example, if the user is using an input object to perform sliding gestures in order to provide the user input, utility scoring module 54 may determine the fourth factor for the respective character string based at least in part on a distance on user interface device 4 from the current position of input object to the suggested character strings. In some examples, utility scoring module 54 may determine the fourth factor for the respective character string based at least in part on lengths of time that the user has historically expended to select suggested character strings, or lengths of the user has historically expended to select the respective character string from a list of suggested character strings.

Suggestion output module 56 may select, based at least in part on the utility scores for the candidate character strings, a subset of the candidate character strings. The subset may include at least one of the candidate character strings. In some examples, suggestion output module 56 may display the subset of the candidate character strings as a list of suggested character strings in GUI 10. If computing device 2 receives an indication of a user input to select one of the suggested character strings, suggestion selection module 58 may replace the relevant series of characters with the selected one of the suggested character strings.

Figure 3:
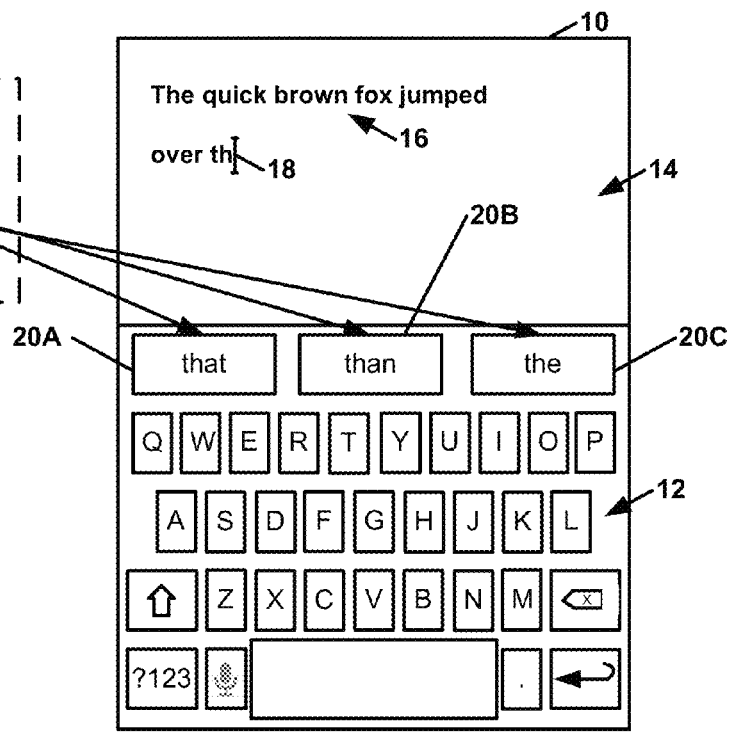
FIG. 3 is a conceptual diagram that illustrates an example process for outputting suggested character strings, in accordance with one or more techniques of this disclosure.

FIG. 3 is a conceptual diagram that illustrates an example process for outputting suggested character strings. FIG. 3 is explained with reference to the example of FIG. 1. However, the example of FIG. 3 is not so limited.

The example of FIG. 3 includes GUI 10 of FIG. 1. As shown in FIG. 3, a delimiter (i.e., the end of the text) immediately follows cursor 18. Accordingly, the relevant series of characters may be the characters between cursor 18 and a delimiter that precedes cursor 18. Thus, in the example of FIG. 3, the relevant series of characters may be "th". IME module 6 may determine that the set of candidate character strings corresponding to the relevant series of characters "th" includes the character strings "than", "that", "the", "theatre", "themselves", and "thermal".

In addition, IME module 6 may determine language scores 100 for the candidate character strings. For each respective character string from the set of candidate character strings, the language score for the candidate character string may be the probability of the respective character string occurring in a particular language given the n preceding words, where n is an integer.

IME module 6 may also determine utility scores 102 for the candidate character strings. For each respective character string from the set of candidate character strings, the utility score for the respective character string may be correlated with how useful it would be to the user to output the respective character string for display as a suggested character string. IME module 6 may determine utility scores 102 in various ways. In the example of FIG. 3, IME module 6 may determine the utility score for a candidate character string by multiplying the language score for the candidate character string by the difference in length between the candidate character string and the relevant series of characters. For instance, in the example of FIG. 3, IME module 6 may determine the utility score for the candidate character string "than" by multiplying 0.098 (i.e., the language score for the candidate character string "than") by 2 (i.e., the difference in length between the candidate character string "than" and the length of the relevant series of characters "th"). As explained elsewhere in this disclosure, IME module 6 may determine utility scores 102 in other ways.

After IME module 6 determines utility scores 102 for the candidate character strings, IME module 6 may determine a portion of the set of candidate scores based at least in part on utility scores 102 for the candidate character strings. IME module 6 may then output the determined portion of the set of candidate character strings for display in GUI 10 as suggested character strings 20. In the example of FIG. 3, the candidate character strings "that", "than", and "the" have the highest utility scores. Accordingly, in the example of FIG. 3, IME module 6 outputs the candidate character strings "that", "than", and "the" as suggested character strings 20.

Figure 4:
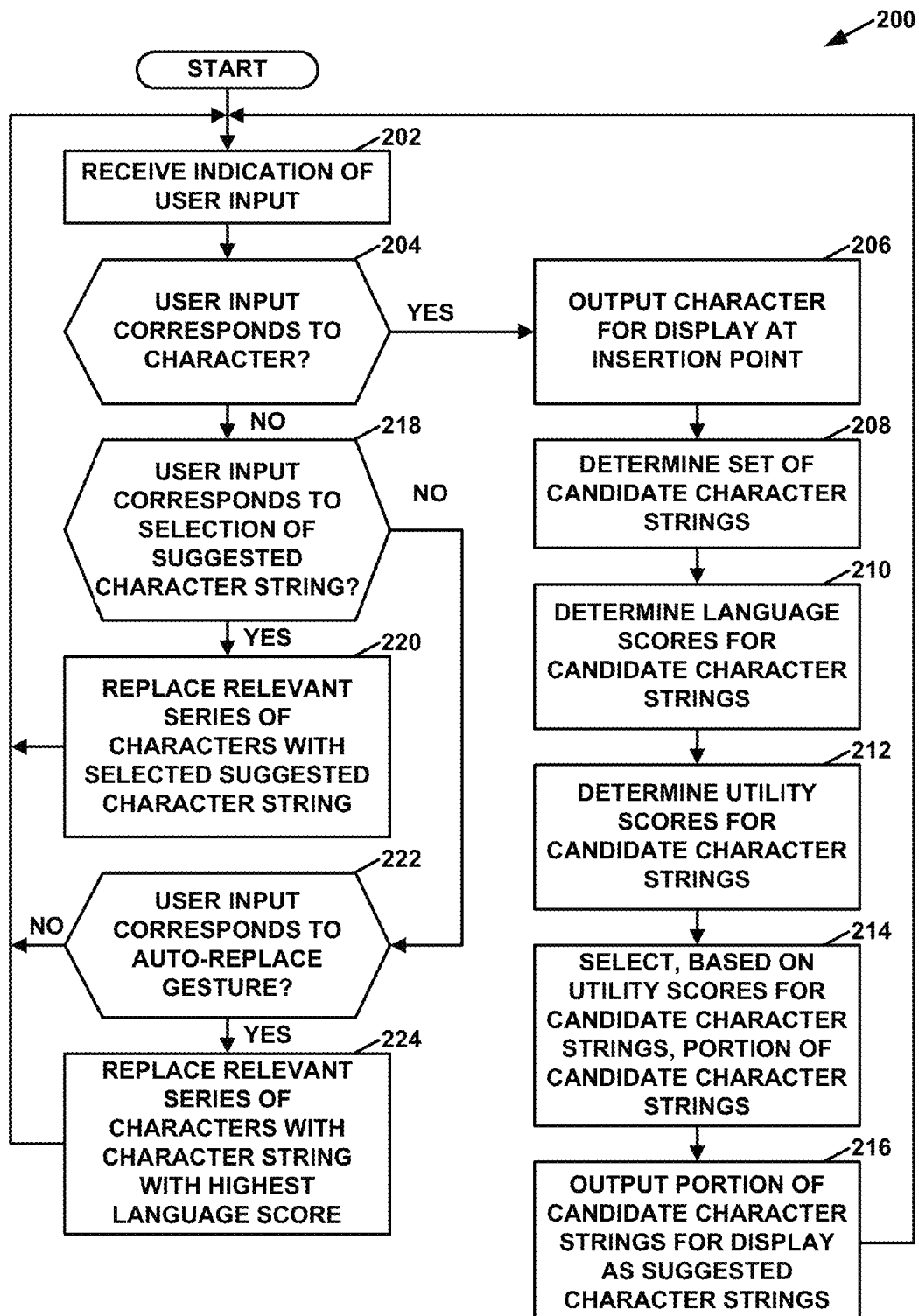
FIG. 4 is a flowchart that illustrates an example operation of a computing device, in accordance with one or more techniques of this disclosure.

FIG. 4 is a flowchart that illustrates an example operation 200 of computing device 2, in accordance with one or more techniques of this disclosure. Although the example of FIG. 4 is explained with reference to the example of FIG. 1, operations similar to operation 200 may be performed in examples other than the example of FIG. 1. Operation 200 is provided as an example. In other examples, a computing device may implement the techniques of this disclosure using other operations, such as operations that include more, fewer, or different actions, and operations that include the actions of operation 200 in different orders.

After operation 200 starts, IME module 6 may receive an indication of user input (202). IME module 6 may then determine whether the user input corresponds to a character (204). In response to determining that the user input corresponds to a character ("YES" of 204), IME module 6 may output the character for display at an insertion point (206). For example, if the user input corresponds to the character "s", IME module 6 may output the character "s" for display.

In addition to outputting the character for display, IME module 6 may determine, based at least in part on a relevant series of one or more already-entered characters, a set of candidate character strings (208). The relevant series of characters may be adjacent to an insertion point and may start or end with a delimiter, such as a space character, a line break, a punctuation mark, or the beginning or end of the text. For example, if the current text in text display area 14 includes the characters "the quick bro" and the insertion point immediately follows the letter "o" in the current text, the relevant series of one or more already-entered characters may be "bro".

Furthermore, IME module 6 may determine a second score (i.e., a language score) for each respective character string from the plurality of candidate character strings (210). In some examples, IME module 6 may determine, for each respective character string from the plurality of candidate character strings, the language score for the respective character string based at least in part on a probability in the language that the user is current using of the respective character string. In this way, the language scores for the candidate character string may indicate the probability of the candidate character string being the character string that the user is currently inputting.

IME module 6 may determine a first score (i.e., a utility score) for each respective character string from the plurality of candidate character strings (212). In some examples, IME module 6 may determine, for each respective character string from the plurality of candidate character strings, the utility score for the respective character string based at least in part on a probability in a particular language of the respective character string occurring given zero or more characters that precede the respective character string, an estimate of time saved by a user if the user were to select the respective character string from a list of suggested character strings, and an estimate of time to be expended by the user to analyze the respective character string in the list of suggested character strings. In some examples, IME module 6 may determine, for each respective character string from the plurality of candidate character strings, the utility score for the respective character string based at least in part on a probability in a particular language of the respective character string occurring given zero or more characters that precede the respective character string, an estimate of time saved by the user if the user were to select the respective character string from a list of suggested character strings, and an estimate of time expended by the user to select the respective character string from the list of suggested character strings. In some examples, IME module 6 may determine, for each respective character string from the plurality of candidate character strings, the utility score for the respective character string based at least in part on a probability in a particular language of the respective character string occurring given zero or more characters that precede the respective character string, an estimate of time saved by the user if the user were to select the respective character string from a list of suggested character strings, an estimate of time to be expended by the user to analyze the respective character string in the list of suggested character strings, and an estimate of time expended by the user to select the respective character string from the list of suggested character strings.

IME module 6 may select, based at least in part on the utility scores for the candidate character strings, a portion of the candidate character strings (214). For example, IME module 6 may select the three candidate character strings with the highest utility scores. IME module 6 may then output the portion of the candidate character strings for display as a list of suggested character strings (216). In some examples, such as the example of FIG. 1, IME module 6 may output the list of suggested character strings at a region of user interface device 4 adjacent to a virtual keyboard. After outputting the portion of the candidate character strings for display as a list of suggested character strings, IME module 6 may loop back to the start of operation 200 and wait for an indication of an additional user input.

In response to determining that the user input does not correspond to a character ("NO" of 204), IME module 6 may determine whether the user input corresponds to the selection of a suggested character string (218). As indicated above, IME module 6 may output a list of suggested character strings for display at user interface device 4. In some examples, IME module 6 may determine that the user input corresponds to the selection of a suggested character string if the user input is a tapping gesture at a region of user interface device 4 that displays the suggested character string.

In response to determining that the user input corresponds to the selection of a suggested character string ("YES" of 218), IME module 6 may replace the relevant series of characters with the selected suggested character string (220). For example, if the relevant series of characters is "bro" and the selected suggested character string is "brown", IME module 6 may replace "bro" with "brown". In another example, if the relevant series of characters is "bor" and the selected suggested character string is "brown", IME module 6 may replace "bor" with "brown". This example demonstrates that the suggested character string may not necessarily have a prefix that matches the relevant series of characters. After replacing the relevant series of characters with the selected suggested character string, IME module 6 may loop back to the start of operation 200 and wait for an indication of an additional user input.

In response to determining that the user input does not correspond to the selection of a suggested character string ("NO" of 218), IME module 6 may determine whether the user input corresponds to an auto-replace gesture (222). In response to determining that the user input does not correspond to an auto-replace gesture ("NO" of 222), IME module 6 may loop back to the start of operation 200 and wait for an indication of an additional user input.

However, in response to determining that the user input corresponds to an auto-replace gesture ("YES" of 222), IME module 6 may replace the relevant series of characters with the candidate character string with a highest language score (224). For example, if the relevant series of characters is "bro" and the candidate character string with the highest language score is "broken", IME module 6 may respond to the indication of the auto-replace gesture by replacing "bro" with "broken". IME module 6 may then loop back to the start of operation 200 and wait for an indication of an additional user input.

Figure 5:
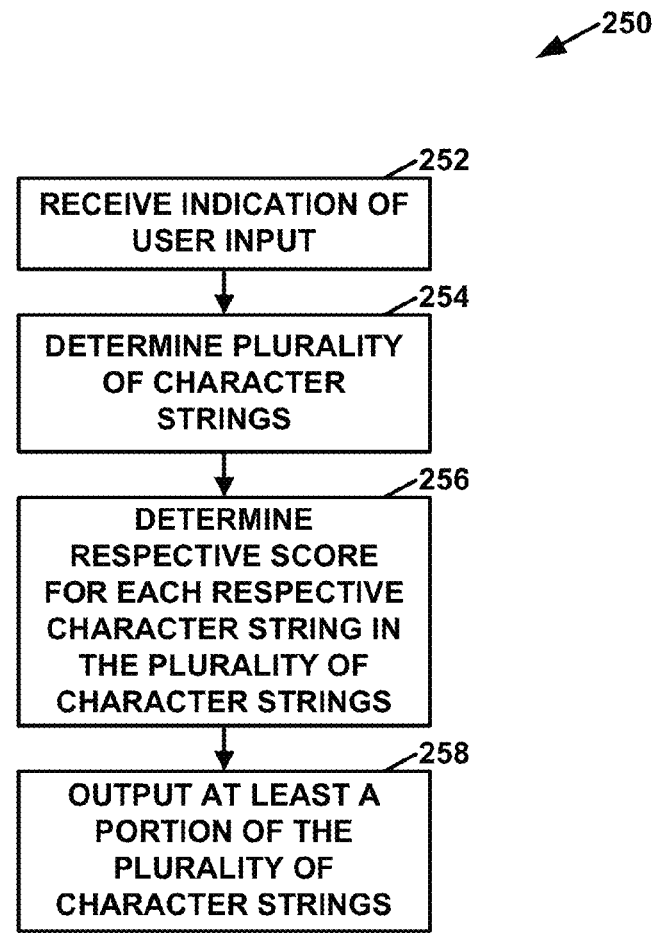
FIG. 5 is a flowchart that illustrates another example operation of a computing device, in accordance with one or more techniques of this disclosure.

FIG. 5 is a flowchart that illustrates an example operation 250 of computing device 2, in accordance with one or more techniques of this disclosure. Operation 200 (FIG. 4) may be a more specific example of operation 250. Operation 250 is provided as an example. In other examples, a computing device may implement the techniques of this disclosure using other operations, such as operations that include more, fewer, or different actions, and operations that include the actions of operation 250 in different orders.

In the example of FIG. 5, computing device 2 may receive an indication of user input (252). The user input may correspond to a series of one or more characters. In response to receiving the indication of the user input, computing device 2 may determine, based at least in part on the series of one or more characters, a plurality of character strings (254).

Furthermore, computing device 2 may determine a respective score for each respective character string from the plurality of the character strings (256). For each respective character string from the plurality of character strings, the respective score for the respective character string is based at least in part on a probability in a particular language of the respective character string occurring given zero or more characters that precede the respective character string, an estimate of time saved by a user if the user were to select the respective character string, an estimate of time to be expended by the user to analyze the respective character string. After determining the respective scores for the character strings, computing device 2 may output, for display at a screen operatively coupled to the computing device, at least a portion of the plurality of character strings (258). The portion of the plurality of character strings may be determined based at least in part on the score for each respective character string from the plurality of character strings.

Figure 6:
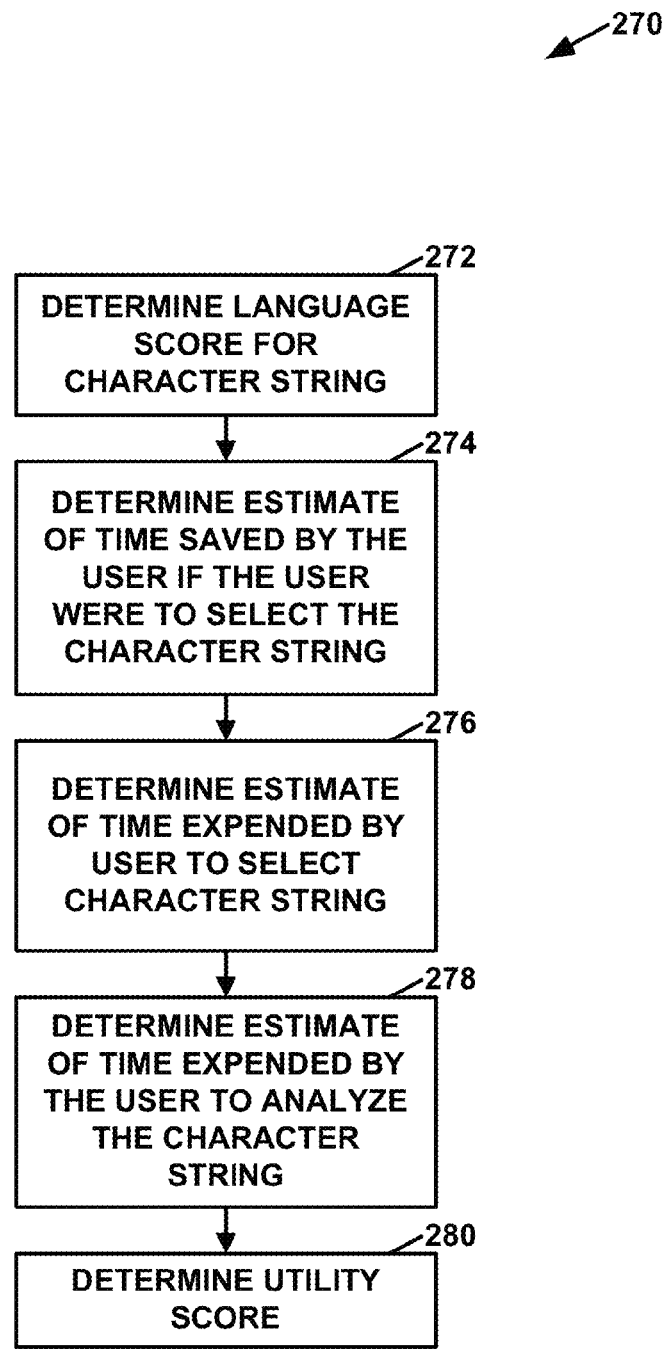
FIG. 6 is a flowchart that illustrates an example operation of a computing device to determine a utility score for a character string, in accordance with one or more techniques of this disclosure.

FIG. 6 is a flowchart that illustrates an example operation 270 of computing device 2 to determine a utility score for a character string, in accordance with one or more the techniques of this disclosure. In the example of FIG. 6, computing device 2 may determine a language score for the character string (272). As indicated above, the language score may be based at least in part on a probability of the character string occurring, given a particular language and zero or more preceding words. Furthermore, computing device 2 may determine an estimate of an amount of time saved by the user if the user were to select the character string from a list of displayed suggested character strings (274). In addition, computing device 2 may determine an estimate of time to be expended by the user to select the character string from the list of displayed suggested character strings (276). Computing device 2 may also determine an estimate of the amount of time to be expended by the user to analyze the character string (278). Computing device 2 may determine the utility score for the character string based on the language score for the character string, the estimate of time expended by the user to select the character string from the list of displayed suggested character strings, the estimate of time to be expended by the user to select the character string from the list of displayed suggested character strings, and the estimate of the amount of time to be expended by the user to analyze the character string (280). Computing device 2 may determine the language score, the time estimates, and the utility score in accordance with any of the examples described above.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperative hardware units, including one or more processors as described above, in conjunction with suitable software and/or firmware.

Various examples have been described. These and other examples are within the scope of the following claims.

The invention claimed is:

1. A method comprising:
receiving, by a computing device, an indication of user input corresponding to a series of one or more characters;
responsive to receiving the indication of the user input, determining, by the computing device, a plurality of character strings that are based at least in part on the series of one or more characters;
determining, by the computing device, a respective score for each respective character string from the plurality of the character strings, wherein determining the respective score for the respective character string comprises:
determining, for the respective character string and based at least in part on lengths of time that a user has historically taken to perform one or more user input actions required to replace the series of one or more characters with the respective character string, a respective estimated amount of time saved by the user if the user were to select the respective character string,
wherein the respective score for the respective character string is based at least in part on a probability of the respective character string occurring in a particular language given zero or more characters that precede the respective character string, the respective estimated amount of time saved by the user if the user were to select the respective character string, and a respective estimated amount of time to be expended by the user to analyze the respective character string; and
outputting, by the computing device and for display, at least a portion of the plurality of character strings, the portion of the plurality of character strings being determined based at least in part on the respective score for each respective character string from the plurality of character strings.

2. The method of claim 1, wherein for each respective character string from the plurality of character strings, the respective score for the respective character string is further based at least in part on a respective estimated amount of time expended by the user to select the respective character string.

3. The method of claim 2, further comprising, for each respective character string from the plurality of character strings, determining, by the computing device, the respective estimated amount of time expended by the user to select the respective character string for the respective character string based at least in part on a user input mode that the user is using to provide the user input.

4. The method of claim 2, wherein determining the respective scores for the respective character strings comprises determining, for each respective character string from the plurality of character strings, the respective score for the respective character string at least in part by calculating $P*S-(D+P*M)$, where P denotes a factor that is based at least in part on the probability in the particular language of the respective character string occurring given the zero or more characters that precede the respective character string, where S denotes the respective estimated amount of time saved by the user if the user were to select the respective character string, where D denotes the respective estimated amount of time to be expended by the user to analyze the respective character string, and where M denotes the respective estimated amount of time to be expended by the user to select the respective character string.

5. The method of claim 1, wherein outputting at least the portion of the plurality of character strings comprises outputting, by the computing device, the character strings in the portion of the plurality of character strings in a sequence that is based at least in part on the respective scores for the respective character strings.

6. The method of claim 5, wherein outputting at least the portion of the plurality of character strings comprises for each respective character string from the plurality of character strings, outputting, by the computing device and for display, the respective character string at a position in the sequence that is easiest for the user to select if the respective score for the respective character string is higher than the respective scores for each other character string from the plurality of character strings.

7. The method of claim 1, wherein:
the indication of the user input is an indication of a first user input;
outputting at least the portion of the plurality of character strings comprises outputting, by the computing device and for display, one or more of the character strings within a graphical user interface (GUI) as one or more suggested character strings; and
the method further comprises:
responsive to receiving the indication of the first user input, outputting, by the computing device and for display, the one or more characters within the GUI;
after receiving the indication of the first user input, receiving, by the computing device, an indication of a second user input; and
responsive to receiving the indication of the second user input, replacing within the GUI, by the computing device, the one or more characters with a particular suggested character string, the particular character string being among the one or more suggested character strings.

8. The method of claim 1, wherein the indication of the user input is an indication of a first user input, and the method further comprises:
responsive to receiving the indication of the first user input, outputting, by the computing device and for display, the one or more characters within a GUI;
determining, by the computing device, based at least in part on the respective scores for the respective character strings, a particular character string from the plurality of character strings;

receiving, by the computing device, an indication of a second user input after receiving the indication of the first user input; and responsive to receiving the indication of the second user input, replacing within the GUI, by the computing device, the one or more characters with the particular character string.

9. The method of claim 1, wherein determining the respective estimated amount of time saved by the user if the user were to select the respective character string comprises determining, by the computing device and based at least in part on a length of the respective character string minus a length of the series of one or more characters, the respective estimated amount of time saved by the user if the user were to select the respective character string.

10. The method of claim 1, further comprising:
outputting, by the computing device and for display, the portion of the plurality of character strings within a GUI as a list of suggested character strings; and
wherein determining the respective estimated amount of time saved by the user if the user were to select the respective character string comprises determining, by the computing device and based at least in part on a number of user input actions required to replace the series of one or more characters with the respective character string if the user does not select the respective character string from the list of suggested character strings, the respective estimated amount of time saved by the user if the user were to select the respective character string.

11. The method of claim 1, wherein determining the respective estimated amount of time saved by the user if the user were to select the respective character string comprises: determining, by the computing device and based at least in part on a speed at which the user is currently typing, the respective estimated amount of time saved by the user if the user were to select the respective character string.

12. The method of claim 1, further comprising, for each respective character string from the plurality of character strings, determining, by the computing device and based at least in part on how many character strings from the plurality of character strings are output for display, the respective estimated amount of time to be expended by the user to analyze the respective character string.

13. The method of claim 1, further comprising, for each respective character string from the plurality of character strings, determining, by the computing device and based at least in part on a frequency with which the respective character string is output as a suggested character string, the respective estimated amount of time to be expended by the user to analyze the respective character string.

14. The method of claim 1, wherein:
the indication of the user input is an indication of a first user input,
the respective scores for the respective character strings are respective first scores for the respective character strings,
outputting the portion of the plurality of character strings comprises outputting, by the computing device and for display, the portion of the plurality of character strings as a set of suggested character strings, and
the method further comprises:
responsive to receiving the indication of the first user input, outputting, by the computing device and for display, the one or more characters within a GUI;
determining, by the computing device, a respective second score for each respective character string from the plurality of character strings, wherein for each respective character string from the plurality of character strings, the respective second score for the respective character string is based at least in part on the probability of the respective character string occurring in the particular language given the zero or more characters that precede the respective character string;
determining, based at least in part on the respective second scores for the character strings and by the computing device, a particular character string from the plurality of character strings; and
receiving, by the computing device, an indication of a second user input;
responsive to determining that the indication of the second user input corresponds to a selection of one of the suggested character strings, replacing within the GUI, by the computing device, the one or more characters with the selected one of the suggested character strings; and
responsive to determining that the indication of the second user input corresponds to an auto-replace gesture, replacing within the GUI, by the computing device, the one or more characters with the particular character string.

15. The method of claim 1, wherein determining the plurality of character strings comprises determining, by the computing device, the plurality of character strings such that each respective character string from the plurality of character strings has a prefix that matches the series of one or more characters or the respective character string is a character string that the user may have intended to input when the user inputted the series of one or more characters.

16. A computing device comprising one or more processors configured to:
determine, responsive to receiving an indication of user input that corresponds to a series of one or more characters, a plurality of character strings based at least in part on the series of one or more characters;
determine a respective score for each respective character string from the plurality of the character strings,
wherein determining the respective score for the respective character string comprises:
determining, for the respective character string and based at least in part on lengths of time that a user has historically taken to perform user input actions required to replace the series of one or more characters with the respective character string, a estimated amount of time saved by the user if the user were to select the respective character string, and
wherein the respective score for the respective character string is based at least in part on a probability in a particular language of the respective character string occurring given zero or more characters that precede the respective character string, the respective estimated amount of time saved by the user if the user were to select the respective character string, a respective estimated amount of time to be expended by the user to analyze the respective character string, and a respective estimated amount of time to be expended by the user to select the respective character string; and
output, for display, at least a portion of the plurality of character strings, the portion of the plurality of character strings being determined based at least in part on the respective score for each respective character string from the plurality of character strings.

17. The computing device of claim 16, wherein the one or more processors are configured to determine, for each respective character string from the plurality of character strings, the respective score for the respective character string at least in part by calculating P*S−(D+P*M), where P denotes a factor that is based at least in part on the probability in the particular language of the respective character string occurring given the zero or more characters that precede the respective character string, where S denotes the respective estimated amount of time saved by the user if the user were to select the respective character string, where D denotes the respective estimated amount of time to be expended by the user to analyze the respective character string, and where M denotes the respective estimated amount of time to be expended by the user to select the respective character string.

18. The computing device of claim 16, wherein:
the indication of the user input is an indication of a first user input; and
the one or more processors are configured to:
output, for display, one or more of the character strings within a graphical user interface (GUI) as one or more suggested character strings;
responsive to receiving the indication of the first user input, output, for display, the one or more characters within the GUI; and
replace, responsive to receiving an indication of a second user input after receiving the indication of the first user input, within the GUI, the one or more characters with a particular suggested character string, the particular character string being among the one or more suggested character strings.

19. The computing device of claim 16, wherein the indication of the user input is an indication of a first user input, and the one or more processors are further configured to:
output, responsive to receiving the indication of the first user input, the one or more characters within a GUI;
determine, based at least in part on the respective scores for the respective character strings, a particular character string from the plurality of character strings;
receive an indication of a second user input after receiving the indication of the first user input; and
responsive to receiving the indication of the second user input, replace, within the GUI, the one or more characters with the particular character string.

20. The computing device of claim 16, wherein, for each respective character string from the plurality of character strings, the one or more processors are configured to determine, based at least in part on a length of the respective character string minus a length of the series of one or more characters, the respective estimated amount of time saved by the user if the user were to select the respective character string.

21. The computing device of claim 16, wherein the one or more processors are configured to:
output, for display, the portion of the plurality of character strings within a GUI as a list of suggested character strings; and
for each respective character string from the plurality of character strings, determine, based at least in part on a number of user input actions required to replace the series of one or more characters with the respective character string if the user does not select the respective character string from the list of suggested character strings, the respective estimated amount of time saved by the user if the user were to select the respective character string.

22. The computing device of claim 16, wherein the one or more processors are configured to determine, based at least in part on a speed at which the user is currently typing, the respective estimated amount of time saved by the user if the user were to select the respective character string.

23. A non-transitory storage device that stores instructions that, when executed by one or more processors of a computing device, cause the computing device to:
responsive to receiving an indication of user input that corresponds to a series of one or more characters, determine a plurality of character strings based at least in part on the series of one or more characters;
determine a respective score for each respective character string from the plurality of the character strings,
wherein determining the respective score for the respective character string comprises:
determining, for the respective character string and based at least in part on lengths of time that a user has historically taken to perform user input actions required to replace the series of one or more characters with the respective character string, a respective estimated amount of time saved by the user if the user were to select the respective character string from a list of suggested character strings, and
wherein the respective score for the respective character string is based at least in part on a probability in a particular language of the respective character string occurring given zero or more characters that precede the respective character string, the respective estimated amount of time saved by the user if the user were to select the respective character string from the list of suggested character strings, a respective estimated amount of time to be expended by the user to analyze the respective character string in the list of suggested character strings, and a respective estimated amount of time to be expended by the user to select the respective character string from the list of suggested character strings; and
output, for display, at least a portion of the character strings from the plurality of character strings in a sequence that is based at least in part on the respective scores for the character strings.

24. The non-transitory storage device of claim 23, wherein the instructions cause the computing device to determine, for each respective character string from the plurality of character strings, the respective score for the respective character string at least in part by calculating P*S−(D+P*M), where P denotes a factor that is based at least in part on the probability in the particular language of the respective character string occurring given the zero or more characters that precede the respective character string, where S denotes the respective estimated amount of time saved by the user if the user were to select the respective character string, where D denotes the respective estimated amount of time to be expended by the user to analyze the respective character string, and where M denotes the respective estimated amount of time to be expended by the user to select the respective character string.

25. The non-transitory storage device of claim 23, wherein, for each respective character string from the plurality of character strings, the instructions cause the computing device to determine, based at least in part on a length of the respective character string minus a length of the series of one or more characters, the respective estimated amount of time saved by the user if the user were to select the respective character string.

* * * * *